United States Patent [19]
Knuth et al.

[11] 4,223,601
[45] Sep. 23, 1980

[54] PRESS WORM, ESPECIALLY FOR FILTER PRESSES

[75] Inventors: Manfred Knuth; Thorsten Homann, both of Hamburg, Fed. Rep. of Germany

[73] Assignee: Fried. Krupp Gesellschaft mit beschränkter Haftung, Essen, Fed. Rep. of Germany

[21] Appl. No.: 948,327

[22] Filed: Oct. 4, 1978

[30] Foreign Application Priority Data

Oct. 8, 1977 [DE] Fed. Rep. of Germany ....... 2745391

[51] Int. Cl.³ ............................................. B30B 9/12
[52] U.S. Cl. ................................. 100/117; 198/676; 228/165

[58] Field of Search ................................. 100/145–150, 100/117; 198/672, 673, 676, 677; 29/157.3 R, 156.8 H, DIG. 26, 127, 156.8 R, 157.3 AH; 228/165, 119; 74/424.7, 458; 366/79; 425/208

[56] References Cited

U.S. PATENT DOCUMENTS

| 3,890,685 | 6/1975 | Runte et al. | 29/157.3 R |
| 4,003,115 | 1/1977 | Fisher | 198/676 |

FOREIGN PATENT DOCUMENTS

557425  2/1957  Italy ................................... 100/145

Primary Examiner—Billy J. Wilhite
Attorney, Agent, or Firm—Karl F. Ross

[57] ABSTRACT

A pressing worm or screw, especially for filter presses of the type used to press liquids from solids, e.g. oils from eatable-oil-bearing seeds, is formed with an outwardly opened groove along its flight or thread which is filled with a harder metal than the flight by deposit welding.

6 Claims, 3 Drawing Figures

PRESS WORM, ESPECIALLY FOR FILTER PRESSES

FIELD OF THE INVENTION

The present invention relates to a method of making a press worm or screw, especially for a worm or screw type filter press of the type used to press oils from oil-bearing seeds and, more particularly, to a method of making a press-worm structure more resistant to wear and to a worm made by this method.

BACKGROUND OF THE INVENTION

A press worm or screw, especially for a filter press, generally comprises a sleeve or the like mounted upon the press shaft and formed with a thread or flight which fits closely into a surrounding housing. The screw is used to generate pressure by the displacement of solid materials, e.g. to press liquids therefrom.

A typical application of a filter press of this type, whose housing is formed with perforations or openings for discharge of the liquid phase, is in the pressing of oils from eatable-oil seeds or the like. Such a press can be used, for example, to press oil from soy beans, cocoa beans and sesame seeds.

It has been proposed heretofore to provide the flight or thread of a worm or screw type press of the aforedescribed type with plates or the like which are composed of a hardened material and are mounted upon the worm body, these plates being releasably connected with the body. Such a system is described, for example, in open German application (Offenlegungsschrift) DT-OS No. 1 927 705.

In addition to this technique it is also known to provide wear resistant or hard-facing coatings upon the surfaces of the flight of the worm most subjected to wear by deposit welding or by flame-spray deposition, plasma deposition or the like. The flight of the worm, along the surfaces coated with such materials, is then subjected to machining to impart the desired finish and dimensions to the worm.

The mounting of plates on the worm body has been found to be extremely expensive construction technique since a large number of precisely dimensioned and shaped parts is required. Furthermore, the formation of hard-facing coatings on the flight of the worm has also been found to be disadvantageous, especially in the case of filter presses for the aforedescribed purposes, because the hard-facing layer is frequently brittle and is sensitive to breakage.

Conventional deposit welding techniques, for example, invariably have required expensive mechanical working or machining of the deposit-carrying surfaces with previous softening-type annealing and subsequent furnace hardening.

When such thermal operations are carried out, the layer is subjected to stress especially if it is not of extremely uniform or constant thickness. As a result of thickness variations, for instance, the weld-deposited layer can be subject to spalling.

OBJECTS OF THE INVENTION

It is the principal object of the present invention to provide an improved method of making a worm for the aforedescribed purposes which will avoid the disadvantages of earlier systems.

Another object of the invention is to provide an improved worm, especially for a filter press for the pressing of oils from eatable-oil seeds or other solid material.

Yet a further object of the invention is to provide an improved press for the generation of extremely high pressures with low wear of the pressure generating flights.

SUMMARY OF THE INVENTION

These objects and others which will become apparent hereinafter are attained, in accordance with the present invention, by providing in a worm or a worm press having at least one flight or helical thread, an outwardly opening groove which extends along the thread, i.e. over the entire length of the flight, helix or thread, the groove being filled with a hard metal by deposit welding.

Reference to a "hard metal" herein is intended to include all hard facing materials heretofore used to improve the wear resistance of a flight or thread for such a worm and can include hard metal alloys, metal carbides such as tungsten carbide and titanium carbide, and any other metal which is more wear resistant and harder than the metal of the flight of the worm itself.

The flanks of the flight or thread can be machined prior to the deposition of the hard material in the groove and only the outer face of the weld deposit and the adjoining lands or edges of the flight require grinding or machining for smoothing purposes to the final dimensions.

The method of the present invention has been found to be far less expensive than conventional fabrication techniques and to yield a worm with especially good resistance to wear and without any danger of loss of the deposit weld material. Furthermore, the hard-material deposit of the present invention does not require thermal treatment techniques after the deposit of the weld.

Preferably, the groove extends the full height of the flight or thread, i.e. has a depth at least equal to the height of the flight or thread (one-half the difference between the root and outer diameters of the worm) so that, with wear of the pressure flank of the flight or thread to eliminate the softer material of the worm forming this flank, a body of the hard material will be exposed over the full height of the flight or thread.

A further advantage of the present invention is that the thickness (measured in the axial direction) of the hard material is limited only by the width of the flight. The groove forms a laterally closed bed for receiving the weldment with total security and reliability.

The lateral wall thickness need only be sufficient to enable the groove to be formed and the weld to be deposited and thus should be as thin as possible so that the pressure flank of the flight will wear rapidly away and expose the reinforcing or hardening material.

Since the thickness of the flight on the side opposite the pressure side need only be sufficient to protect the reinforcing or hardening material against breakthrough during welding, the thickness or width of the deposited material, measured in the axial direction, can be practically equal to or extend over the major part of the width of the flight. The worm has a far greater useful life than conventional worms.

According to still another feature of the invention, the pressure side in a wall of the groove, prior to filling with the weldment can be inclined to the axis so that, once the weldment is deposited and shrinks, the weldment flank is practically perpendicular to the axis. This configuration is thus optimum and can be imparted by a corresponding shaping of the groove.

BRIEF DESCRIPTION OF THE DRAWING

The above and other objects, features and advantages of the present invention will become more readily apparent from the following description, reference being made to the accompanying drawing in which.

SPECIFIC DESCRIPTION

A flight or threaded sleeve 2 is keyed to the worm shaft 1 and has, along its outer surface, a helically extending thread or worm (flight).

This worm is formed with a groove which opens outwardly and is at least as deep as the height of the thread or flight and is defined between walls 4 and 5.

The groove is filled by a weldment of wear resistant deposit-weld material by any conventional deposit welding technique.

Figure 3:
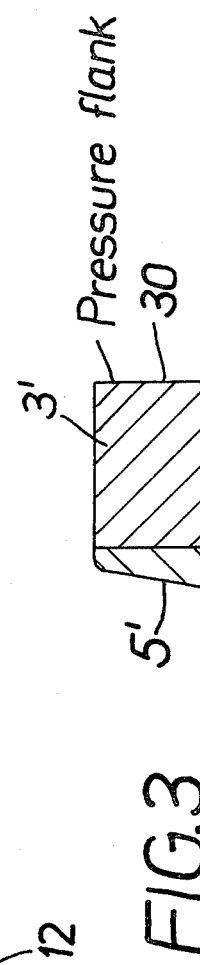
FIG. 3 is a view similar to FIG. 1 but showing the worm after the pressure side of the flight has been worn away.

As has been shown in FIG. 3, with use of the worm, the pressure side flank 4 wears rapidly away to expose the surface 30 of the body 3' of weldment. The pressure flank is thus formed by this weldment.

Figure 1:
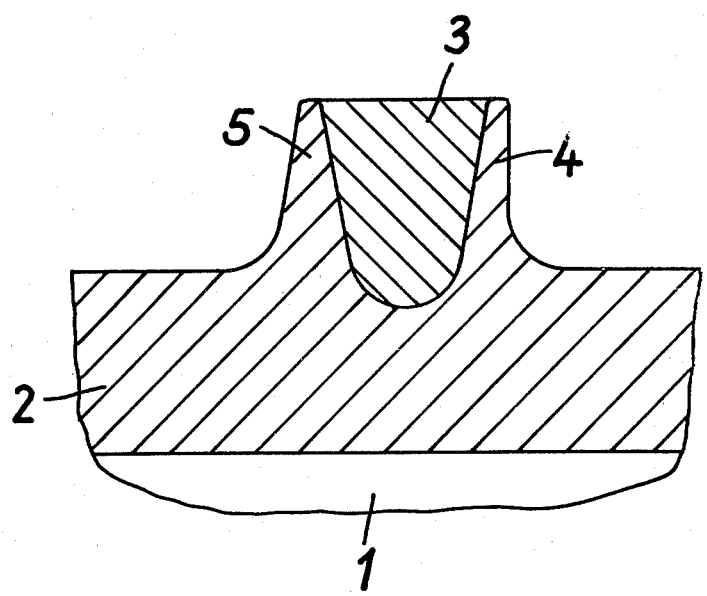
FIG. 1 is a cross-sectional view through a portion of a flight of a worm of the present invention, prior to use, showing the weldment deposited in the groove.
Figure 2:
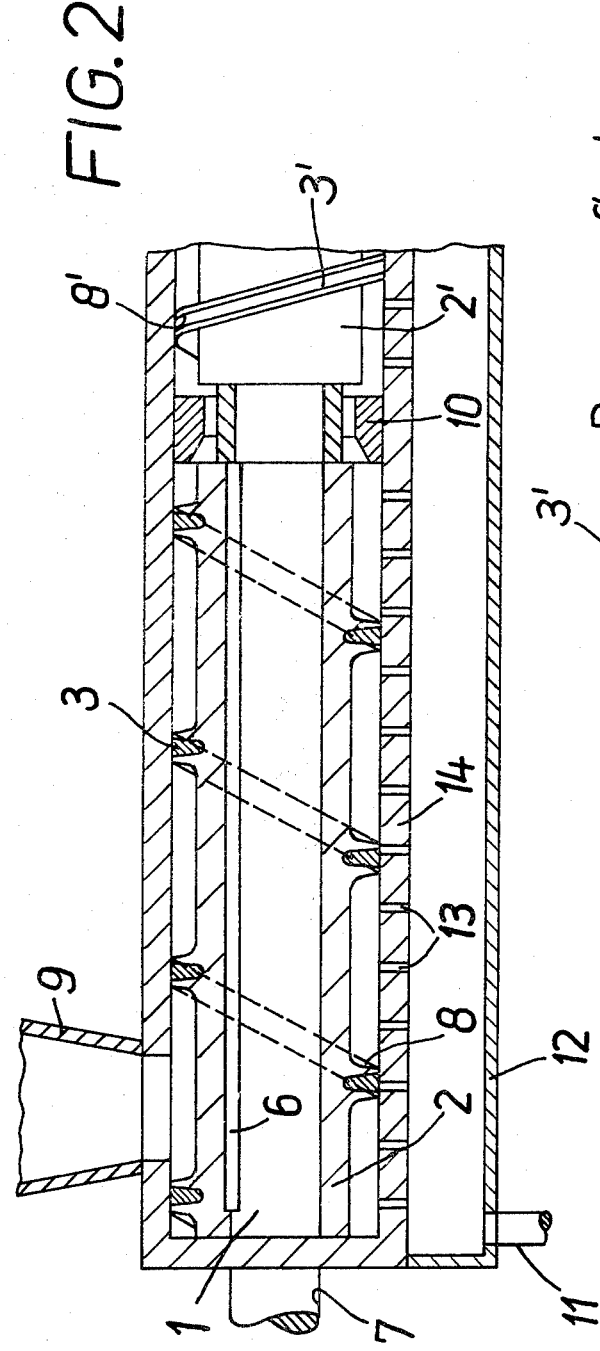
FIG. 2 is an axial cross-sectional view through a filter press for the pressing of oil-bearing seeds in accordance with the present invention.

The system of FIGS. 1 and 3 can be provided for a press of the type shown diagrammatically in FIG. 2.

In this press, a housing 14 forms a cylinder which is provided with bores 13 opening into a jacket 12 from which the oil pressed from the seeds is led away via a fitting 11.

A hopper 9 deposits the seeds into the cylinder 14 in which a worm is rotatable. The worm comprises the aforementioned worm shaft to which the sleeves 2, 2', etc. of the respective worms are keyed at 6, each worm defining a respective pressure stage of the press. Between the pressure stages, throttles 10 are provided so that the pressure within each stage builds up to a maximum and is then spontaneously relieved before the material is passed into the next stage for compression therein to a still higher pressure from the ambient pressure level.

The flights of the succeeding worms have been represented at 8 and 8' and are filled with weldment 3 and 3' as shown and as has been described in connection with FIGS. 1 and 3.

From FIG. 3 it will be seen that flight 30 is perpendicular to the axis of the worm as a result of shrinkage after the weld deposit was formed.

We claim:

1. A pressing worm, especially for a filter press, comprising a worm body formed with a generally helical flight, said flight being provided along its length with an outwardly open groove defined between walls unitary with the body, and a weldment deposited in said groove and completely filling same flush with the outer periphery of the flight and continuously along the length of the worm, the weldment being composed of a material harder than that of the worm body.

2. The worm defined in claim 1 wherein one of said walls is disposed along the pressure flank of the worm, said one of said walls having a thickness only sufficient to enable the weldment to be deposited in said groove and wearing away upon use of said worm to expose the weldment deposited in said groove.

3. The worm defined in claim 2 wherein the opposite wall of the groove has a thickness only sufficient to prevent breakout of the weldment.

4. The worm defined in claim 2 wherein said one of said walls has an inner surface which is inclined to the axis at an angle such that upon shrinkage of the weldment, the surface of the weldment lying against said inner surface is perpendicular to the axis of the worm.

5. A method of making a worm for a filter press, comprising forming a worm body with an outwardly projecting helical flight, providing between walls unitary with said body an outwardly open groove continuously along said flight and to a depth equal to the height of said flight, depositing a body of weldment in said groove flush with the outer surfaces of said flight to completely fill said groove continuously along the length thereof, said weldment being of a material harder than that of the worm body.

6. A filter press for the pressing of eatable-oil seeds comprising a cylinder, a worm rotatable in said cylinder and formed with a body having a unitary helical flight, said flight having an outwardly open groove defined between walls unitary with the body extending continuously along the worm, and a weldment completely filling said groove flush with the outer periphery of said flight, said weldment being composed of a harder material than that of the worm.

* * * * *